United States Patent [19]

Eckert et al.

[11] Patent Number: 4,531,499

[45] Date of Patent: Jul. 30, 1985

[54] CONTROL DEVICE FOR REGULATING THE EXHAUST GAS RECYCLING RATE IN AN INTERNAL COMBUSTION ENGINE WITH SELF-IGNITION

[75] Inventors: Konrad Eckert; Wolfgang Ripper, both of Stuttgart; Wolf Wessel, Oberriexingen, all of Fed. Rep. of Germany

[73] Assignee: Robert Bosch GmbH, Stuttgart, Fed. Rep. of Germany

[21] Appl. No.: 401,286

[22] Filed: Jul. 23, 1982

[30] Foreign Application Priority Data

Sep. 19, 1981 [DE] Fed. Rep. of Germany ....... 3137390

[51] Int. Cl.$^3$ .................... F02M 25/06; F02D 21/08
[52] U.S. Cl. .................................. 123/571; 123/569
[58] Field of Search ............................... 123/571, 569

[56] References Cited

U.S. PATENT DOCUMENTS 4,314,534 2/1982 Nakajima et al. .................. 123/571
4,315,492 2/1982 Gardner ............................. 123/571

Primary Examiner—Parshotam S. Lall
Assistant Examiner—W. R. Wolfe
Attorney, Agent, or Firm—Edwin E. Greigg

[57] ABSTRACT

A control device is proposed for regulating the exhaust gas recycling rate in an internal combustion engine with self-ignition in which combustion pressure signals are adjusted directly or indirectly to nominal values dependent on operating characteristics of the engine. In one particular embodiment the combustion pressure signal is differentiated and the frequency of certain occurring amplitude values is adjusted to a nominal value. Owing to the integration of specific combustion processes into the regulation, the device is capable of operating with relatively high precision. It is particularly well suited to compensate for drift phenomena.

12 Claims, 6 Drawing Figures a)  b)

a)  b)

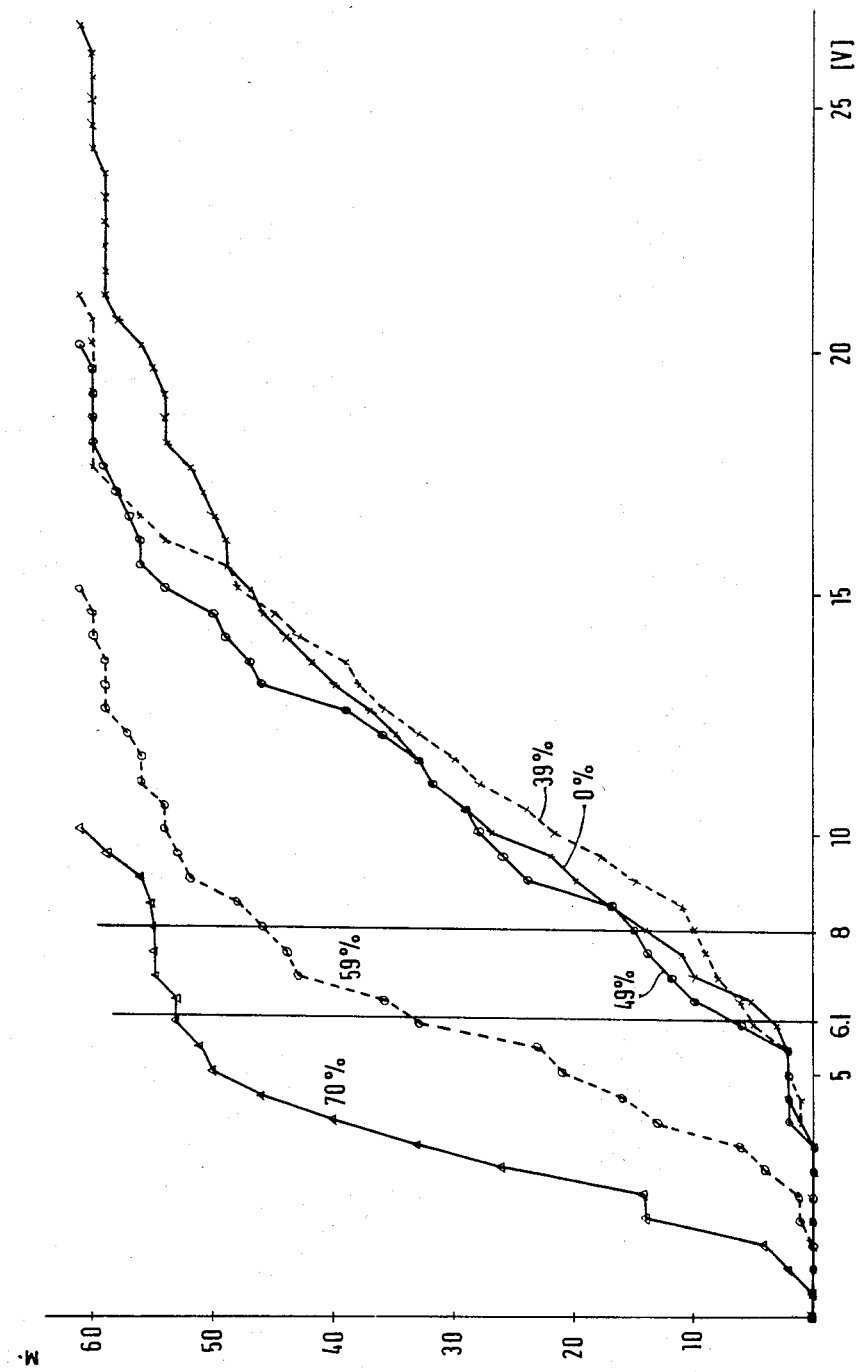

CONTROL DEVICE FOR REGULATING THE EXHAUST GAS RECYCLING RATE IN AN INTERNAL COMBUSTION ENGINE WITH SELF-IGNITION

BACKGROUND OF THE INVENTION

The present invention relates to a control device for regulating the exhaust gas recycling rate in an internal combustion engine with self-ignition.

Regulation of the exhaust gas recycling rate in self-igniting internal combustion engines is of great significance for reasons related to the exhaust gas. The reason is that the fuel combustion rate varies with the proportion of exhaust gas in the cylinder fuel mix. The same applies to varying ratios among the components of the exhaust gas. Generally, the rate at which combustion occurs decreases as the proportion of the exhaust gas is raised, which in turn leads to enhanced combustion of certain component impurities. On the other hand, a high admixture of exhaust gas affects the output capacity of the internal combustion engine.

A number of different exhaust gas metering devices in internal combustion engines with self-ignition are known which set the proportion of exhaust gas in the total cylinder fuel mix in conformity with load and rpm signals. While these known systems generally operate in a satisfactory manner, they are not capable of yielding optimum results in all operating conditions of the engine. This is because in these systems the combustion processes, as such, cannot be observed directly and thus an appropriate reaction cannot be initiated.

OBJECT AND SUMMARY OF THE INVENTION

It is an object of the present invention to provide an exhaust gas recycling control which is optimized over the known exhaust gas recycling controls in that more operating conditions of the engine than load and rpm are considered.

According to the present invention nominal values for any desired operating condition of the engine are stored and a comparison to actual values made for control purposes. The actual values are derived from monitoring combustion chamber pressure and the nominal values are derived by measurement techniques for the particular type of engine, and relate optimum amplitudes and frequency for desired exhaust gas ratios in the combustion mixture.

In the control device of this invention for regulating the exhaust gas recycling rate, the adjustment also involves in large measure the physical behavior of the combustion process, so that optimum results can be achieved by means of the control device.

BRIEF DESCRIPTION OF THE DRAWING

The drawings represents one embodiment of the invention which is described and explained in greater detail below.

FIG. 3 presents a frequency diagram for certain signals; and

DESCRIPTION OF THE PREFERRED EMBODIMENT

Figure 1:
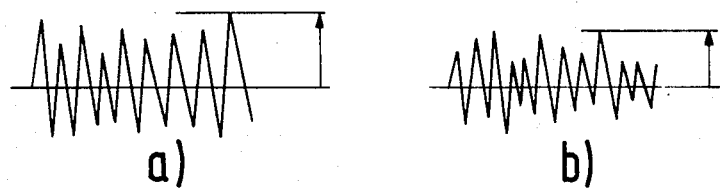
FIGS. 1a and b and 2a and b show the shape of the signals of the control device according to the present invention.
Figure 2:
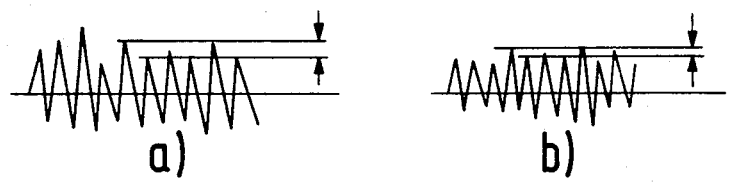

With exhaust gas recycling the rate of combustion in a cylinder depends on the proportion of exhaust gas in the total cylinder fuel mix, and these different combustion rates result in pressure fluctuations which yield the signals shown in FIGS. 1 and 2. In this context, FIGS. 1a and 2a show the shape of the differentiated combustion pressure signal in the absence of recycled exhaust gas, while FIGS. 1b and 2b display the corresponding signal when the exhaust gas is recycled. FIGS. 1 and 2 clearly illustrate the considerably higher maximum amplitudes in the differentiated combustion pressure signal when the exhaust gas is not recycled. The reason is that in this case the flame front advances very rapidly through the combustion chamber and is thus followed by sharp pressure rises.

Not only the maximum amplitudes of the differentiated combustion signal but also the uniformity of the combustion processes vary with the exhaust gas recycling rate. This can be seen in FIG. 2. In this illustration, the course of the differentiated combustion pressure signal without recycled exhaust gas is seen to be considerably less smooth, a fact that results in different maximum amplitudes. By contrast, combustion is smoother in a cylinder fuel mix containing exhaust gas, although statistical scatterings do show stray values.

While FIGS. 1 and 2 are only rough representations of conditions under differentiated combustion pressure with and without recycled exhaust gas, FIG. 3 shows a diagram of measurements in which positive amplitude values of the differentiated pressure signal are plotted along the abscissa in volts, and frequency in time of the corresponding positive amplitudes is plotted along the ordinate. Also, the percentages noted for the various curves designate exhaust gas content of the combustion mixture. If, in the particular example of FIG. 3, threshold values such as 6.1 volts are observed for the positive amplitude, then it can be seen that the frequency in time of the occurring amplitudes increases with the proportion of exhaust gas. The change in frequency is particularly pronounced within the 50 to 70% exhaust gas range. Whereas conditions are relatively well defined when the proportion of exhaust gas is high, there occur distorted values because of special physical phenomena when the proportion of exhaust gas is less than 50%. This is noticeable, for example, for a threshold value of 8 volts, where the frequency is lower for 39% of exhaust gas than for 0%.

In the case of the particular internal combustion engine which produced the diagrams shown in FIG. 3, the control device of the invention is thus particularly well adapted for the range above 50% of exhaust gas, the threshold value being assumed to be about 6 volts. Depending on the threshold position and the interpretation of the measured frequencies, however, even ranges under 50% are controllable. The optimum exhaust gas recycling rate determined by tests is about 50% for the present case.

On the basis of the possibility shown in FIG. 3 for accurately assigning to a percentage of exhaust gas in the fuel mix an amplitude and corresponding frequency, one can determine and regulate the proportion of exhaust gas by means of the amplitude and corresponding frequencies. The block diagram for a corresponding control device is shown schematically in FIG. 4.

Figure 4:
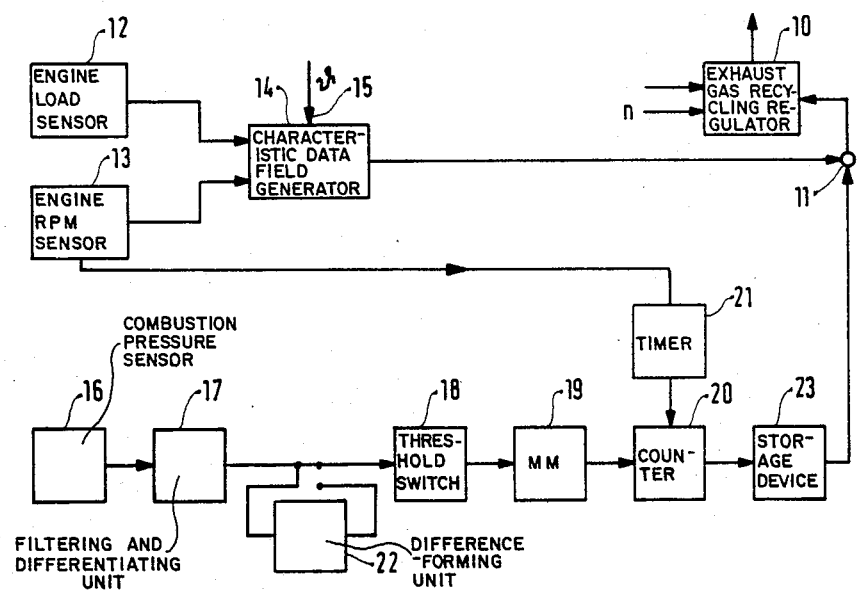
FIG. 4 is a schematic block diagram of the control device according to the present invention.

Referring to FIG. 4, the control device includes an exhaust gas recycling regulator 10 for an internal combustion engine (not shown) on whose input side a nominal value/actual value comparison point 11 has been inserted. Engine load sensor 12 and engine rpm sensor 13 are provided which feed their output signals to a multi-dimensional characteristic data field generator 14 in which nominal frequency values corresponding to the ordinate values of FIG. 3 are stored. A special input 15 to the generator clarifies, for example, a temperature-dependent effect on the data values which ultimately provide the nominal value for transmission to comparison point 11.

A combustion pressure sensor 16 is connected to a filtering and differentiating unit 17 which is followed by a threshold switch 18 and a monostable multivibrator 19.

The output signals of the monostable multivibrator 19 are recorded by a counter 20 in an rpm dependent time interval predetermined by a timer 21 and stored temporarily in a storage device 23. The stored result is then fed to the comparison point 11 as an actual value. A difference-forming unit 22 is located between filtering and differentiating unit 17 and threshold switch 18. It is activated when, instead of the amplitude values in the differentiated signal, it is the amplitude differences that are to be picked up to regulate the exhaust gas recycling rate.

The control device represented in FIG. 4 for regulating the exhaust gas recycling rate operates as follows:

The sensor 16 is embodied as a pressure sensor for detecting combustion pressures within the combustion chamber, or it is embodied as an appropriately modified knock sensor in the internal combustion engine for detecting combustion pressure. The outputs from the sensor 16 are filtered by the filtering and differentiating unit 17, thereby generating the signal shapes shown in FIGS. 1 and 2. The threshold switch 18 that follows scans the differentiated signals for a threshold value and if such a threshold value is exceeded, the subsequent monostable multivibrator 19 is triggered and counter 20 raises its count by 1. At the end of an rpm dependent time interval determined by timer 21, the final count is stored in storage device 23 and is then fed as an actual value for exhaust gas regulation. The corresponding nominal values originating in characteristic data field generator 14 were selected by measurement techniques for the particular type of internal combustion engine.

Based on the plotting of particular amplitude frequencies in the differentiated combustion pressure signal, a certain number of combustion processes must necessarily be analyzed before utilization of the measurement result becomes possible. As a consequence, this type of exhaust gas recycling regulation is relatively slow, but it makes possible in a relatively simple way a continuous calibration of a simple controlled exhaust gas recycling system in which the arrangement shown in FIG. 4 can eliminate changes affecting the exhaust gas recycling rate, such as drift phenomena. In such a case, this adjustment need not be very rapid and may even take place only in particular operating ranges which are well suited for it (in this connection, see the illustration of FIG. 3) and/or which are particularly critical.

The individual elements of the block diagram in FIG. 4 are known as such and consequently require no detailed explanation. In the case where the device of FIG. 4 is intended to operate only under certain specific operating conditions, switching devices, which are also known in the art, and whose operations is load and rpm dependent, for instance, must be provided in exhaust gas recycling control device 10.

What is claimed and desired to be secured by Letters Patent of the United States is:

1. A method of controlling a device for regulating the exhaust gas recycling rate in an internal combustion engine with self-ignition, the improvement comprising;
    detecting the combustion pressure in at least one cylinder of the engine and forming an actual-value number of occurrences which exceed a threshold value within a duration of a set time period of a timer;
    generating a nominal value signal dependent on engine operating characteristics and forming a set-point number of times a threshold value is exceeded within a duration of a set time period of said timer; and
    influencing an exhaust gas recirculation rate in accordance with the actual-value and set-point numbers.

2. A method as set forth in claim 1 which comprises: directly adjusting the actual value signal with the nominal value signal.

3. A method as set forth in claim 1 which comprises: indirectly adjusting the actual value signal with the nominal value signal.

4. In a control device for regulatng an exhaust gas recycling rate in an internal combustion engine with self-ignition, the improvement comprising:
    means for detecting a combustion pressure in at least one cylinder of the engine within a duration of a set time period;
    means for forming an actual-value signal for each pressure occurrence which exceeds a threshold value within a set time period of a timer;
    means for generating a nominal value signal dependent on engine operating characteristics;
    means for forming set-point signals for a number of times a threshold value is exceeded within a duration of a set time period of a timer; and
    means for influencing an exhaust gas recirculation rate in accordance with a number of actual-value signals and a number of set-point signals occuring during said set time period.

5. In the control device as defined in claim 4, wherein the means for detecting the combustion pressure includes:
    a combustion pressure sensor which generates a signal proportional to combustion chamber pressure; a differentiator connected to the sensor for differentiating the signal generated by the sensor; and means for determining a nunber of occurrences of predetermined amplitude values of the differentiated signal, and means for adjusting the frequency of those predetermined amplitude values of the differentiated signal to a nominal value.

6. In the control device as defined in claim 4, wherein the means for detecting the combustion pressure includes: a combustion pressure sensor which generates a signal proportional to combustion chamber pressure; a differentiator connected to the sensor for differentiating the signal generated by the sensor; and means for determining a mean difference in the amplitude values of the differentiated signal; and means for adjusting the mean difference to a nominal value.

7. In the control device as defined in claim 4, wherein the device is activated only under specific operating conditions of the engine.

8. In the control device as defined in claim 4, wherein the means for detecting the combustion pressure includes a knock sensor.

9. In the control device as defined in claim 4 which comprises:
   means for directly adjusting the actual value signal to a nominal value signal.

10. In the control device as defined in claim 4 which comprises means for indirectly adjusting the actual value signal to a nominal value signal.

11. In the control device as defined in claim 4, wherein the control device includes an exhaust gas recycling regulator, wherein the means for detecting the combustion pressure includes:
   a combustion pressure sensor; a filtering and differentiating unit connected to the sensor; a threshold switch connected to the filtering and differentiating unit; a monostable, multivibrator connected to the threshold switch, said monostable multivibrator being actuated by an output signal from the filtering and differentiating unit through the threshold switch; counter means connected to the monostable multivibrator; a timer connected to the counter means, said counter means counting output signal from said monostable multivibrator during an rpm related time period controlled by said timer, and generating said actual value signal; and a comparator means for receiving and comparing the actual value signal to the nominal value signal, and wherein said exhaust gas recycling regulator is adjusted by the output from the comparator means.

12. In the control device as defined in claim 11, wherein the means for detecting the combustion pressure further includes:
   a difference-forming unit connected between the filtering and differentiating unit and the threshold switch.

* * * * *